Patented Mar. 6, 1923.

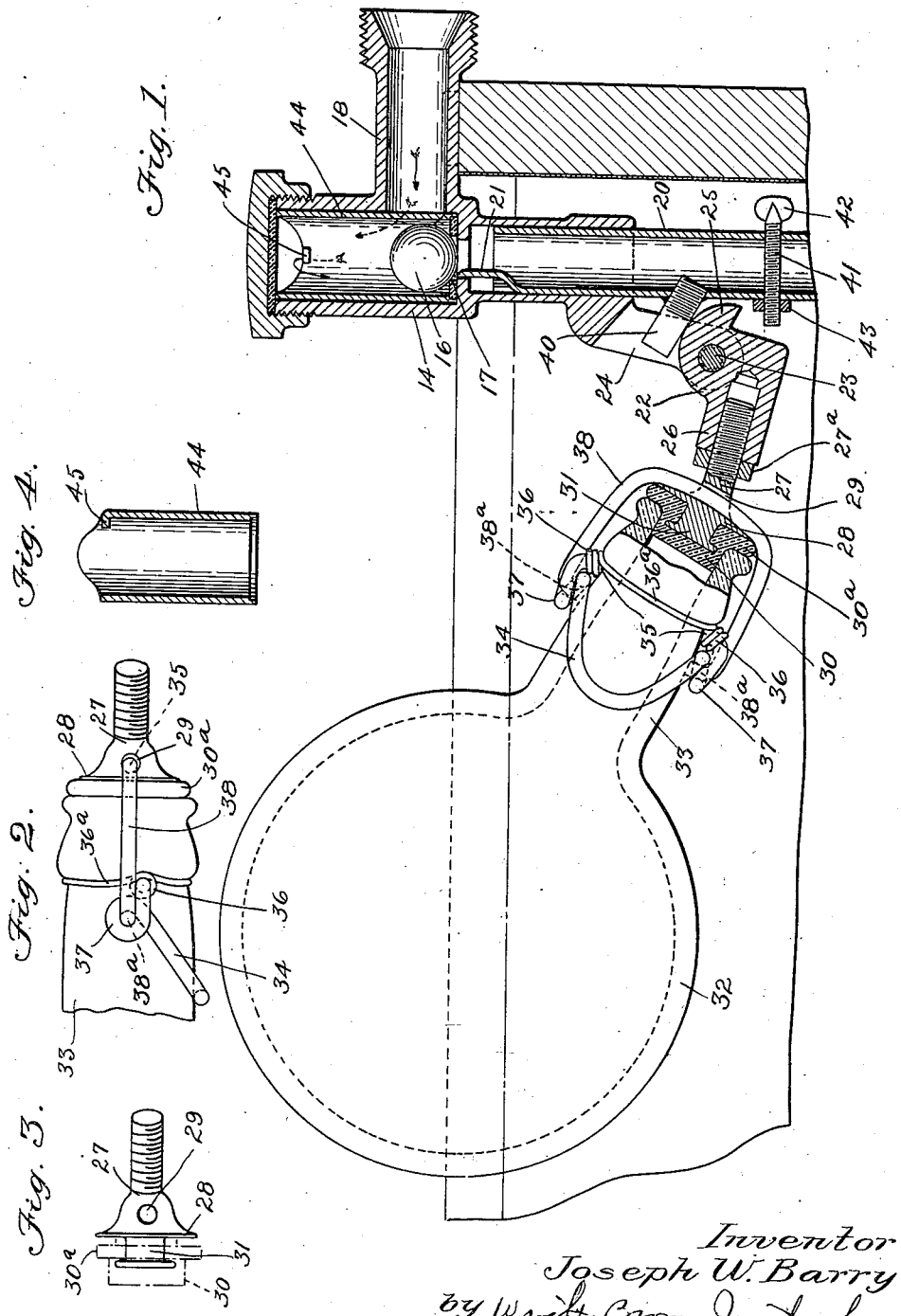

1,447,231

UNITED STATES PATENT OFFICE.

JOSEPH W. BARRY, OF EVERETT, MASSACHUSETTS; JOHN C. O'MALLEY ADMINISTRATOR OF THE ESTATE OF SAID JOSEPH WALTER BARRY, DECEASED.

COCK.

Application filed February 18, 1920. Serial No. 359,600.

*To all whom it may concern:*

Be it known that I, JOSEPH WALTER BARRY, a citizen of the United States, residing at Everett, in the county of Middlesex and State of Massachusetts, have invented new and useful Improvements in Cocks, of which the following is a specification.

This invention relates to so-called ball cocks, controlling the ingress and egress of water to and from flushing tanks, or other receptacles, the liquid-controlling valve of the cock being opened by the descent of a float supported by a body of water in the tank, and connected with a lever which communicates motion from the float to the valve.

One object of the invention is to provide an improved construction of the lever and float, providing for a quick and secure detachable connection between the lever and float, which is preferably of glass, thus avoiding complicated, tedious, and expensive connecting means, such as are presented by a toggle bolt with its attendant check nuts, washers, etc.

Other objects of the invention are to provide improvements relating to certain details of the structure disclosed by my Patent No. 925,153, dated June 15, 1909.

The invention is embodied in the improvements which I will now proceed to describe and claim.

Of the accompanying drawings forming a part of this specification,—

Figure 1 is a sectional view of a portion of a flushing tank and a ball cock embodying my invention, applied thereto, the cock being mainly shown in section, and the float being shown mainly in elevation and the toggle coupling hereinafter described, being shown in side elevation.

Figure 2 is a side view, showing the stud forming the outer end of the longer arm of the lever, and an edge view of the toggle coupling.

Figure 3 is a top plan view of the stud and head shown by Figure 1.

Figure 4 is a sectional view of the valve-containing sleeve hereinafter described.

The same reference characters indicate the same parts in all of the figures.

The cock as a whole is constructed to operate substantially as described by the patent above mentioned. 14 represents the cock casing having a chamber which contains the spherical valve 16, normally held by fluid pressure against a valve seat 17, the casing 14 being provided with an inlet branch 18. 20 represents the discharge tube, which has a sliding fit in the portion of the casing 14, below the valve seat, said tube having a finger 21, adapted to tip or roll the spherical valve 16, all as set forth in the patent above described.

As before, the tube 20 opens the valve when it is raised by the downward movement of a float lever, and it descends by its own weight, to permit the valve to close when the float lever rises.

The float lever has two arms of unequal length, and is composed of a hub portion 22, connected by a fulcrum pin 23, with fixed ears 24, on the casing 14, said hub having a cam projection 25 at one side of the fulcrum, constituting the shorter arm of the lever. The hub has an internally threaded socket 26, projecting from the opposite side of the fulcrum, and constituting an inner member of the longer arm of the lever. 27 represents a screw-threaded shank engaged with the socket 26, and constituting an outer member of the longer arm of the lever. Said stud is provided with a rigid, and preferably circular head 28 at its outer end, the head and stud being preferably formed in one piece, as a casting, and the stud being provided with a transverse orifice 29 at the inner side of the head.

30 represents a compressible stopper, which may be of elastic rubber, and is firmly secured to the head 28, preferably by means of a flanged stud 31, formed on the head and embedded in the material of the stopper, as shown by Figure 1.

32 represents a hollow float, which is preferably spherical, and is provided with a suitably elongated tubular neck 33, said float and neck being preferably made of glass. The neck is formed to receive and be securely closed by the stopper 30, the mouth of the neck bearing on the flange 30$^a$ of the stopper.

The float neck is detachably secured to the lever by means of a toggle coupling. One element of said coupling is a substantially U-shaped lever member 34, having inwardly projecting trunnions 35 at its opposite ends, adapted to turn in sockets 36 formed by convolutions of a wire band 36$^a$, surrounding the neck 33.

The lever 34 is provided with loops or eyes 37, forming sockets at opposite sides of the neck and adjacent to the sockets 36. The toggle coupling also includes a substantially U-shaped tension member 38, the neck portion of which passes loosely through the stud orifice 29, so that the tension member is pivoted to the stud. The end portions of the tension member are bent inwardly to form trunnions 38ª, adapted to turn in the sockets 37 on the lever member. When the lever member 34 is in the position shown by the drawings, and bears against the neck, as indicated by Figure 2, the tension member 38 cooperates with the lever in confining the mouth of the neck against the stopper, and maintaining the stopper under compression between the float neck and the head 28, this being the condition that prevails when the toggle is active. When the toggle is rendered inactive, or is broken by swinging the lever member 34 outward from the position shown by Figure 2, the bottle leck is permitted to recede from the stopper, and is detachable therefrom.

It will be seen that the head 28, the stopper 30, and the toggle coupling above described, constitute a well known form of bottle stopper which I have adapted for use in a float lever by rigidly connecting the stud 27 to the head portion of an ordinary bottle stopper, so that the stopper is rigidly connected with the portion of the longer arm of the lever formed by the shank 27. The operation of the toggle coupling moves the float neck toward and from the stopper, instead of moving the stopper toward and from the neck, as is the case in a bottle stopper.

It will be seen by reference to Figure 1, that the stud 27 is inclined relatively to the head 28, so that the longitudinal axis of the stud is inclined relatively to the longitudinal axis of the neck 33 and float 32. This arrangement permits a variation of the height of the float, by turning the shank 27 in the socket 26. The shank is provided with a lock nut 27ª, to prevent its accidental rotation.

The shorter arm 25 of the lever bears on a screw-post 40, attached to the tube 20, so that when the float descends, the tube 20 is raised to open the valve 16 by means of the finger 21.

The tube 20 is provided below the screw-post 40 with an adjustable stop, which limits the downward movement of the float, and is composed of a screw-threaded stud 41, engaged with tapped orifices in opposite sides of the tube 20, and provided at one side of the tube with a head 42, whereby it may be conveniently turned to adjust it lengthwise. A lock-nut 43 on the stud prevents accidental rotation thereof. The stud 41 is arranged to form an abutment for a shoulder on the hub portion 22 of the float lever. The adjustability of the stud enables the descent of the float lever, and the quantity of water discharged to be regulated to any extent desired.

44 represents a thin metal sleeve loosely inserted in the casing 14, and attached at its lower end to the margin of the valve seat 17, the sleeve 44 being adapted to be withdrawn with the valve seat and valve from the casing, and to be inserted with said parts into the casing.

There is sufficient space between the external surface of the sleeve and the internal surface of the portion of the casing 14 in which the sleeve is inserted, to permit water to pass from the inlet branch 18 to and into the upper end of the sleeve, as indicated by the arrows in Figure 1.

To permit the convenient manipulation of the sleeve 44, I provide it with an inwardly projecting ear 45, arranged to engage a finger inserted in the outer end of the sleeve.

The sleeve 44 sometimes becomes corroded, so that a plumber, repairing the valve, cannot pull the sleeve out by inserting his finger in the sleeve, and in many cases has to remove the entire cock from the tank. The inwardly projecting ear 45 furnishes a bearing for the operator's finger, whereby he is enabled to exert sufficient force on the tube to turn it, and release it from binding engagement with the casing. The ear also enables a prying tool, such as a screw-driver, to be inserted in the tube and used effectively to disengage the latter from the casing.

I claim:

1. A cock having float-controlled valve-operating means, comprising a two-armed float lever having arms of unequal length, the outer end of the longer arm being provided with a rigid head, a compressible stopper attached to said head and projecting outwardly therefrom to engage a tubular float neck, and a toggle coupling composed of a lever member, adapted to be pivoted to the float neck, and a tension member pivoted to the longer lever arm and to the said lever member, said coupling, when active, confining the mouth of a float neck against the stopper, and maintaining the stopper under compression between the float neck and the head.

2. A cock having float-controlled valve-operating means, comprising a two-armed float lever having arms of unequal length, the outer end of the longer arm being provided with a rigid head, a compressible stopper attached to said head and projecting outwardly therefrom, a hollow float having a tubular neck, formed to be closed by the stopper, and a toggle coupling composed of a lever member pivoted to the float neck, and a tension member pivotally connected to the longer lever arm and to the said lever member, said coupling being adapted to confine the mouth of the float neck against the stopper, and to maintain the stopper under compression between the float neck and the head.

3. A cock having float-controlled valve-operating means, comprising a two-armed float lever having arms of unequal length, and composed of a hub portion adapted to be fulcrumed to a fixed support, and including a projection at one side of the fulcrum constituting the shorter arm, and a screw-threaded socket at the opposite side of the fulcrum constituting an inner member of the longer arm, a threaded stud engaged with said socket and having a head at its outer end, said stud constituting an outer member of the longer arm, a compressible stopper attached to the stud head and projecting outwardly therefrom to engage a tubular float neck, and a toggle coupling pivoted to the stud and having means for detachably engaging the float neck, said coupling, when active, confining the neck against the stopper and confining the stopper under compression against the stud head.

4. A cock substantially as specified by claim 3, the stud being inclined relatively to the head to incline the longitudinal axis of the neck and float relatively to the axis of the stud, so that a rotary movement of the stud in the socket varies the height of the float.

5. In a cock which includes a casing, a movable discharge tube, a valve cooperating with said tube, and a float lever adapted, when moved in one direction, to move the tube in the direction required to open the valve, adjustable means for limiting the valve-opening movement of the float lever, said means being embodied in a stop screw engaged with tapped orifices in opposite sides of the discharge tube, the ends of the screw projecting from opposite sides of the tube, one end of the screw being provided with a head outside the tube whereby it may be rotated and longitudinally adjusted, and the opposite end being in the path of the float lever, and arranged to arrest the downward movement of the latter.

In testimony whereof I have affixed my signature.

JOSEPH W. BARRY.